United States Patent
Duault et al.

[11] Patent Number: 5,912,894
[45] Date of Patent: Jun. 15, 1999

[54] METHOD AND SYSTEM FOR MONITORING TRAFFIC TO OPTIMIZE THE BANDWIDTH RESERVED TO AN AUDIO CHANNEL CONNECTION IN A HIGH SPEED DIGITAL NETWORK

[75] Inventors: Maurice Duault, St. Laurent du Var; Claude Galand, Cagnes sur Mer; Gerard Lebizay, Vence; Bernard Pucci, Cagnes sur mer; Gerard Richter, St. Jeannet, all of France

[73] Assignee: International Business Machines Corporation, Armonk, N.Y.

[21] Appl. No.: 08/786,915

[22] Filed: Jan. 22, 1997

[30] Foreign Application Priority Data

Jun. 20, 1996 [EP] European Pat. Off. ............ 96480084

[51] Int. Cl.[6] .................................................... H04J 3/17
[52] U.S. Cl. ........................... 370/433; 370/468; 370/477
[58] Field of Search ....................... 370/431, 433, 370/435, 437, 442, 458, 465, 468, 477

[56] References Cited

U.S. PATENT DOCUMENTS

| | | | |
|---|---|---|---|
| 5,313,467 | 5/1994 | Varghese et al. ................. | 370/468 |
| 5,592,470 | 1/1997 | Rudrapatna et al. ............... | 370/477 |
| 5,613,198 | 3/1997 | Ahmadi et al. .................... | 370/468 |
| 5,638,363 | 6/1997 | Gittins et al. ..................... | 370/468 |

*Primary Examiner*—Chau Nguyen
*Assistant Examiner*—Phuongchau Ba Nguyen
*Attorney, Agent, or Firm*—Daniel E. McConnell; Thomas F. Galvin

[57] ABSTRACT

This invention deals with a method and system for dynamically adjusting the communication bandwidth assigned to an audio channel connection in a high speed digital network. More particularly, the invention is made to track the activity of a voice assigned connection (e.g. a PBX or PABX entry to the network), define a so-called activity bit for each block of audio channel signal and then dynamically adjust the assigned network communication bandwidth accordingly. Adjustment of the communication bandwidth is accomplished by integrating the audio channel activity bits through a predefined integration function, the result of which is then compared against predefined threshold values in order to determine an appropriate bandwidth setting for the audio channel.

10 Claims, 7 Drawing Sheets

METHOD AND SYSTEM FOR MONITORING TRAFFIC TO OPTIMIZE THE BANDWIDTH RESERVED TO AN AUDIO CHANNEL CONNECTION IN A HIGH SPEED DIGITAL NETWORK

FIELD OF THE INVENTION

This invention deals with a method and system for dynamically adjusting the communication bandwidth assigned to an audio channel connection in a high speed digital network. More particularly, the invention is made to track the activity of a voice assigned connection, i.e. a PBX or PABX entry to the network and dynamically adjust its assigned network communication bandwidth accordingly.

BACKGROUND OF THE INVENTION

Modern digital networks are made to operate in a multimedia environment for transporting different types of data, i.e. pure data or digitized information signals (including voice, image, video, etc . . . ) over the same high speed digital network, while ensuring the compliance with the requirements specific to each kind of these data traffics.

Transporting over same network means that in practice, multimedia sources are physically connected to same network nodes and multiplexed over same network links (also called trunks) interconnecting the network nodes. Thus the different types of traffic share the same links/trunks bandwidths. To that end, a so called packet switching technique is used whereby the digitized data are arranged into so called bit packets, which packets are then multiplexed over the same links with their specific bandwidth being assigned according to predefined bandwidth criteria.

One may notice that the information provided by the various users can be divided into different types. These include non-real-time type of information, i.e. information that can be delivered to a destination end user of the network with minor time constraint restrictions; and real time type information that must be transmitted to the end-user with a predefined limited delay restriction The latter type includes voice information If some real time type information is not transferred within said time delay, it should simply be discarded, bearing in mind however that techniques have been provided for recovering, to some extent, the discarded data These techniques include so-called interpolation/extrapolation These techniques do however have their limitations On the other hand, non real time data traffic can be delayed but suffer no loss. Techniques have been developed accordingly for managing the corresponding data traffic. These techniques include retry and re-transmissions that, unfortunately add to the data traffic which is already heavy to manage and support.

Bearing in mind the above requirements and characteristics of the various types of traffics, one may understand that while optimizing the available transmission bandwidth is a must, it is however far from being simple to achieve This is even emphasized when considering the network architectures presently available in the field.

Cost efficiency requirements lead to designing communication networks that have at their disposal limited resources at all network levels and more particularly at the level of link/trunks bandwidths and node resources to manage these bandwidths and control the traffic.

It is to be noted that in the following description the expression link or trunk shall be used equally with no difference being made, as far as this invention is concerned.

As per the transport of voice originated data, it has already been noted that these data do appear at the source level in so-called "talkspurts" form with long silences in between Accordingly, techniques have already been used to optimize the assigned communication bandwidth For instance, a so called TASI Technique has been used for concentrating a very large number of sources into a smaller number of channels This technique is based on statistical considerations which do apply to a very large numbers of sources concentrated on a same network entry But this is not the case with actual high speed digital networks processing multimedia information, in which one or a small number of PBXs or PABXs, herein designated as audio type sources, might be connected to a network entry node, together with other data sources such as host computers, servers, video sources, etc . . .

There is, therefore, a need for developing methods and means for optimizing the communication bandwidth assigned/reserved to audio type sources (i.e. assigned to voice type channels) and efficiently manage the network links bandwidth accordingly.

Objects of the Invention

One object of this invention is to provide a method and a system for managing a network entry assigned to an audio type channel so as to dynamically adjust, in operation, the corresponding bandwidth reservation accordingly.

Another object of this invention is to provide a method and system for monitoring a PBX (or PABX) entry to a high speed digital network and adjust the network assigned bandwidth according to the actual type of traffic provided on said entry.

Still another object of this invention is to provide a method and system for monitoring an audio type entry to a high speed digital network, detect modem operation on said entry channel and adjust the network assigned bandwidth according to the actual traffic provided by said entry.

A further object of this invention is to provide a method and system to efficiently assign network bandwidth reservation to an audio type connection which is implementable on existing networks with almost no additional hardware being required.

These and other objects, characteristics and advantages of this invention will become more apparent from the following detailed description of a preferred embodiment of the invention when considered with reference to the accompanying figures.

SUMMARY OF THE INVENTION

The above mentioned objects are achieved by a method for optimizing the reserved transmission bandwidth assigned to an audio channel connection providing data to an entry node in a high speed digital network said method including:

splitting the audio channel data into fixed length blocks of data;

monitoring the audio channel activity as indicated by the energy variation of said consecutive data blocks and deriving therefrom a so-called audio channel activity flag data;

integrating the consecutive audio channel activity flag data through a predefined integration function A(n), n being the time reference, said integration being operated over said audio channel activity data;

monitoring, at a predefined rate, said integrated function A(n) with respect to predefined threshold values; and, switching said bandwidth reservation to a transmission bandwidth value selected among a set of predefined transmission bandwidths values when said monitored integrated function A(n) data reaches one of said predefined threshold values.

DESCRIPTION OF A PREFERRED EMBODIMENT OF THE INVENTION

Figure 1:
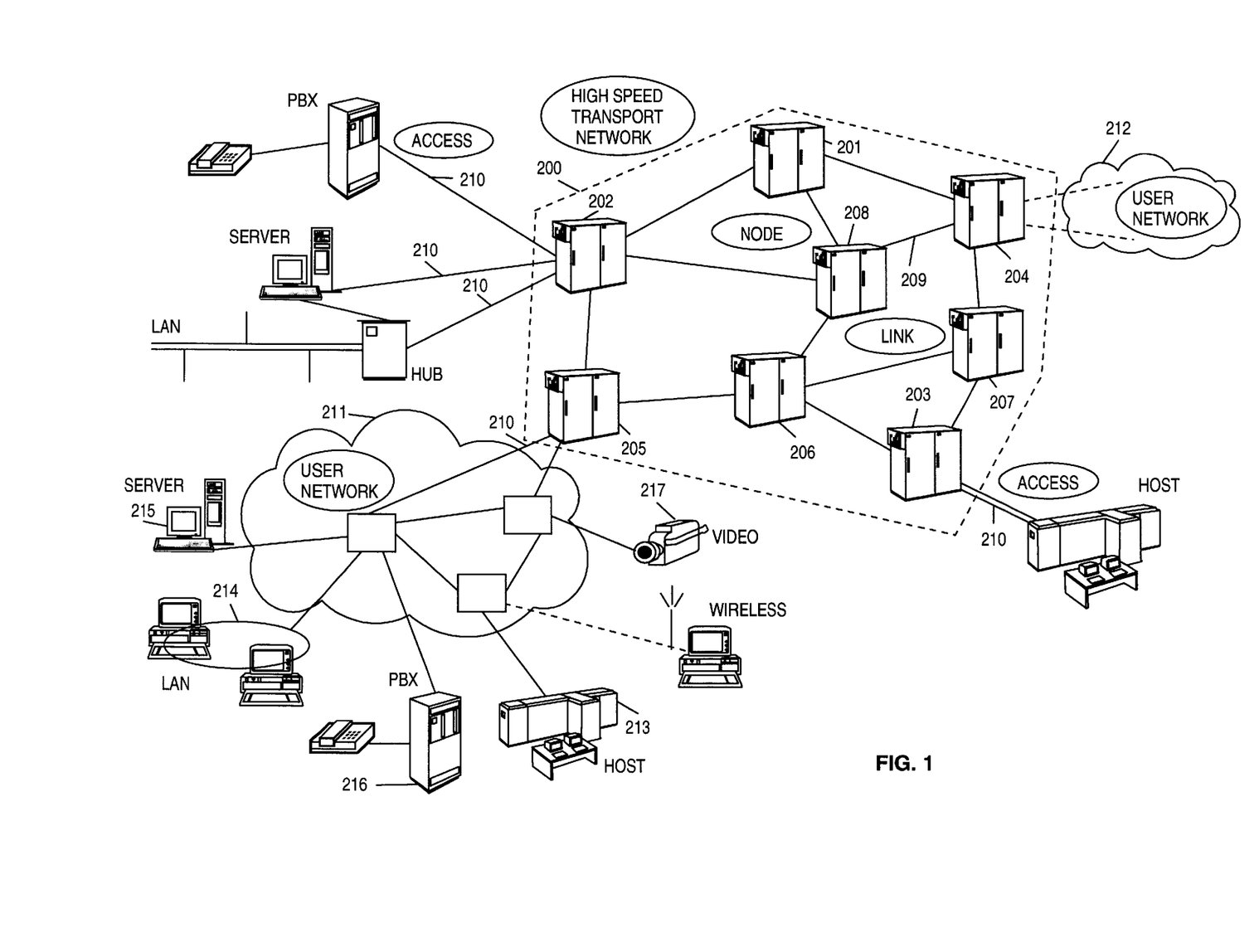
FIG. 1 is a model of communication network wherein the invention can be implemented.

As illustrated in FIG. 1 a typical model of communication system is made of several user networks (212), communicating through a high performance network (high speed digital network) (200) using private lines, carrier provided services, or public data networks Each user network can be described as a set of communication processors and links (211) interconnecting large computers used as Enterprise Servers (213), user groups using workstations of personal computers attached on LAN (Local Area Networks 214), or applications servers (215), PBX (Private Branch Exchange 216) or PABX, or video servers (217). These user networks, dispersed in different establishments, need to be interconnected through high speed transport facilities.

Different approaches can be used for organizing the data transfers. Some architectures involve the checking for data integrity at each network node, thus slowing down the transmission. Others are essentially looking for a high speed data transfer. To that end the transmission, routing and switching techniques within the nodes are optimized to process the flowing packets towards their final destination at the highest possible rate. The present invention applies essentially to the latter category and more particularly to the fast packet switching network architecture detailed in the following paragraphs.

The high speed transport network used herein is a packet switching transmission system comprising eight nodes (201 to 208) these nodes being interconnected by means of high speed communication lines called Trunks or Links (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices in a optimal manner. For example, the Access Node 202 interfaces respectively a Private Branch Exchange (PBX), an application server and a hub through assigned Ports and communicates with other network attached users through the network by means of the adjacent Transit Nodes 201, 206, 207 and 208. The PBX could, as far as this invention is concerned, be replaced by a PABX. Naturally, these devices may also be simultaneously attached to the network, in any possible combinations. Each network node (201 to 208) includes a Routing Point where the incoming data packets are selectively routed on the outgoing Trunks towards the neighboring Transit Nodes. Such routing decisions are made according to the information contained in the header of the data packets being vehiculated over the network.

The transmission bandwidths of the trunks exiting the nodes (e.g. node 202) are shared by all the node entry traffic in an optimal manner. To that end, each user is guaranteed a quality of service (QoS) specified in terms of a maximum delay and a packet loss probability. At the entry node 202, a processor means (e.g. so-called control point) uses the QoS and the traffic characteristics specified by the user (e.g. the PBX) to compute the amount of bandwidth or equivalent capacity of the connection ($C_{eq}$) to be reserved on every trunk along the path connecting a source end user to a destination end-user. The bandwidth $C_{eq}$ is meant to guarantee a packet loss probability on the considered trunk which is smaller than the loss probability which was specified for the considered connection.

At call set up, i.e. whenever a new connection must be established between a calling end user and a destination end user (e.g. between two PBX's), a route controller within the entry node (e.g. 202), performing trunk connection management operations, calculates the optimum routes through the network so as to minimize the amount of network resources (e.g. links bandwidth) used to complete a communication path between the two end users.

All the information necessary for the routing, about the nodes and transmission trunks connected to the nodes, are stored in a Network Topology Database within each network node. Under steady state conditions, every node has the same view of the network thanks to its Topology Database. The network topology information is updated whenever the network operating conditions are changed. Such information is exchanged by means of control messages with all other nodes involved, to provide the necessary up to date information needed to monitor and control the network traffic by updating the Network Topology Databases.

Such database updating are carried by control packets very similar to the data packets exchanged between network end users. The fact that the network topology is kept current in every node through continuous updates allows dynamic network reconfigurations, but also adds to the network traffic.

Therefore, even though control messages do operate to optimize network operation under actual conditions, they add to the data traffic and should be kept at reasonable level to avoid the congestion of the network.

But, links and trunks are very expensive items. Therefore cost efficiency requirements lead to the need for methods and means for assigning communication bandwidth as a function not only of the user's requirements defined at call set-up, but also by matching as much as possible to the actual source traffic.

Several solutions have been provided to dynamically adjust the network links bandwidth and even perform said dynamic adjustment without disrupting already established connections whenever possible.

Therefore, on the one hand dynamic transmission bandwidth adjustment is obviously needed for efficient operation of high speed digital networks; and some means are available for performing this function. On the other hand, this does add to the network traffic and may lead to network congestion. Accordingly methods and means for efficiently monitoring actual users' traffic to enable controlling their dynamically assigned bandwidth reservation in an optimal manner is a must. The present invention shall focus on that and more particularly whenever traffic on a so-called audio channel is involved.

Now, what characterizes the audio type traffic issuing from a PBX or a PABX, for instance, is that it might derive from voice, music, a noisy environment, FAX signal, modems or idle patterns, etc . . . In effect, while essentially voice signals might be expected to be present by the destination, in a PBX output signal, more and more often music is used to put the calling party on waiting situation while looking for the called correspondent. Also, special patterns are used to synchronize PBX or PABX attached modems, for instance when operating on FAX mode, said FAX signals being different from speech signals. And in all cases, the systems operate at a moment or another in a noisy environment. Also, idle patterns may be used to signal a busy terminal. Finally one should recall that speech operates in so-called talkspurts with silences in between talkspurts. Usually, those silences which are longer than a predefined time length are qualified as long silences, to be distinguished from short silences within the talkspurts. All these different signals have different transmission bandwidth requirements For the purpose of this invention, we shall refer to all these kinds of information as audio type information. The easiest way to satisfy these requirements is to design the bandwidth assigned based on the worst case (i.e. the highest bandwidth), which is obviously also the worst solution from a cost efficiency standpoint.

Figure 2:
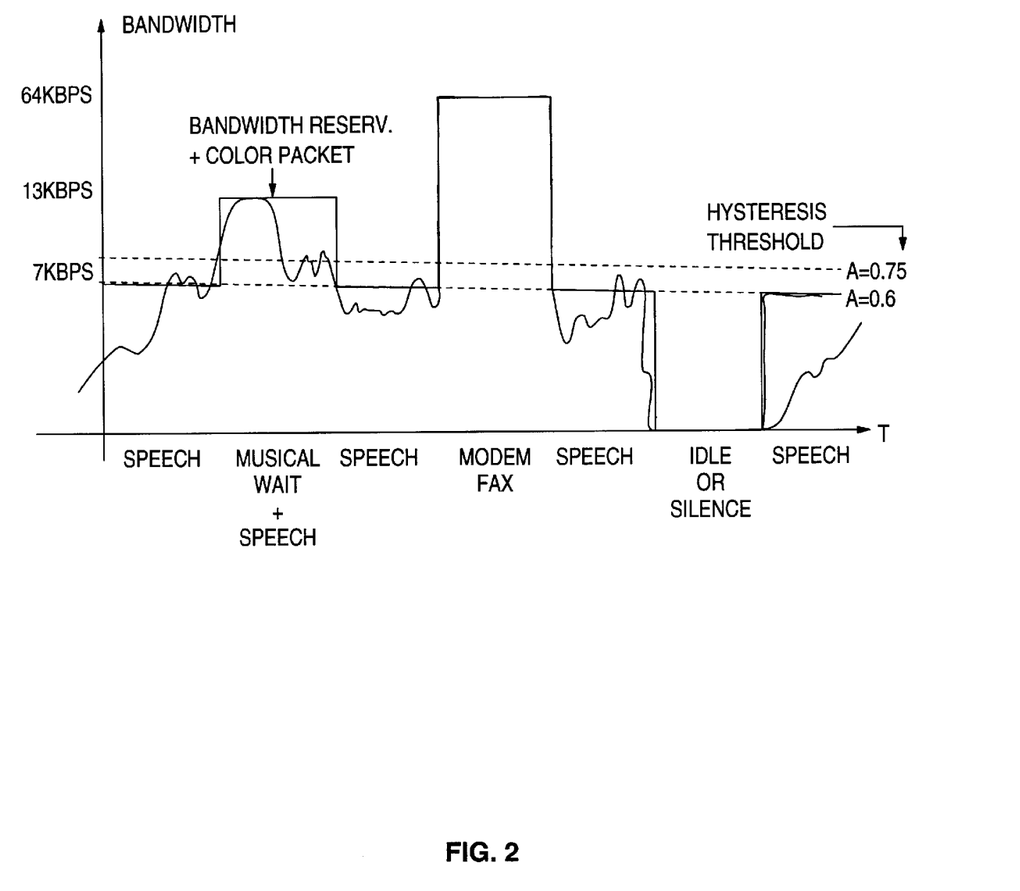
FIG. 2 is an example of signal of signal on an audio type channel.

Let's consider an example of signal issuing from a PBX attached to the high speed digital network as represented in FIG. 2. The signal starts with speech and then switches to musical wait and speech, then again speech, fax from a modem, speech, a long silence and finally speech. The highest bandwidth requirement (see Y axis) is for fax at 64 Kbps, while 13 Kbps are required for music, 7 Kbps are required for speech and no bandwidth at all for long silences. Based on the worst case, one should thus assign 64 Kbps to the considered PBX connection, which is obviously far from being permanently needed and therefore is inefficient from a network efficiency standpoint.

This invention provides a method for optimizing the bandwidth effectively assigned or reserved, which method is implementable on already existing networks including bandwidth adjustment processing, as it practically requires no specific additional device to be used.

In effect modern digital networks are designed to detect the so called long silences and transmit only their coded duration rather than the corresponding steady state. To that end, a Voice Activity Detection (VAD) device tracks the audio channel activity.

The audio system operates usually on 20 ms long blocks of signal samples and VAD algorithm operations are performed by a digital device analyzing each 20 ms long block of samples. For each 20 ms long block, the VAD provides a one bit long flag data with said bit being set to one to indicate activity as represented by the considered PBX or other audio channel signal block, or set to zero for an inactive audio channel.

This VAD flag bit is used to monitor the audio channel output and help in performing the dynamic bandwidth adjustments looked for. The VAD flag bit information is first integrated through a predefined integration function providing low pass filtering of the VAD flag data analyzed over a predefined period (e.g. 20 seconds long). In the preferred embodiment the integration function is:

$$A_{(n+1)}=(1-\alpha)A_{(n)}+\alpha X_{(n)}$$

wherein:
α is a constant coefficient selected to help integrating over a predefined number, e.g. five to ten, silences of medium length so that only long silences shall trigger the system;
n represents the sample time sequence;
$X_{(n)}$ is the value of the VAD flag bit at time n; and
$A_{(n)}$ is the value of the integrated function at time n.

For example, the basic formula for α is $\alpha=1-e^{-\Delta t/T}$
wherein
Δt is the block duration, e.g.; 20 ms for the considered implementation of the invention; and
T is the period selected for performing the analysis of the integration function; e.g. T=20 s for the preferred embodiment;
By approximation:

$$e^{-\Delta t/T}\approx 1-\Delta t/T$$

then $\alpha\approx 1-(1-\Delta t/T)\approx\Delta t/T\approx 1/N$, with N being the number of integration windows, for example, N=1000.

Also, various threshold values are predefined to help triggering the bandwidth assignment switching from one value to another, and thus perform the corresponding bandwidth reservations.

Figure 3:
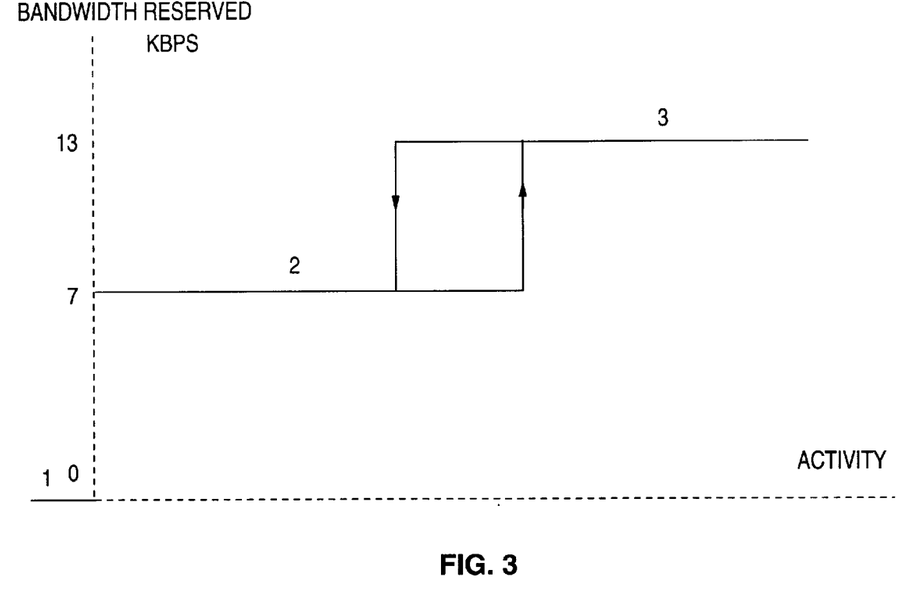
FIG. 3 is an hysteresis type of operation according to the invention.

Represented in FIG. 3 is an hysteresis type of operation for enabling three different bandwidths levels to be assigned (i.e. zero, 7 Kbps and 13 Kbps). The system shall start with assigning a 7 Kbps bandwidth reservation to the audio channel and keep tracking $A_{(n)}$. When $A_{(n)}$ reaches a predefined threshold of 0.75 the bandwidth reservation switches to 13 Kbps. Should $A_{(n)}$ reach a second predefined threshold set to 0.6, then the bandwidth reservation switches back to 7 Kbps. For a zero bandwidth to be reserved, $A_{(n)}$ must be steady at zero for 40 seconds (denoting a long silence). But after a long silence, as soon as X=1, the bandwidth is immediately reestablished to 7 Kbps.

Naturally the above selected threshold values, as well as the number of thresholds and the bandwidth values may all be varied without departing from the scope of this invention.

The above operating conditions as illustrated in FIG. 3 are based on the assumption that the considered audio channel is operating with a conventional, so called GSM, compression rate operated with a factor five. Such compression is performed when coders, such as so called CELP or ADPCM or MPE/LTP coders, as opposed to simple conventional Analog to Digital Coders, operate on the audio channel signal (voice signal). An example of such a coder has been disclosed, for instance, by C. Galand, M. Rosso, Ph. Elie and E. Lanpon in 1988, in an article "MPE/LTP Speech Coder for Mobile Radio Application" published by Elsevier Science Publishers B.V. (North Holland), Vol. 7, No2, July 1988 pp. 167–178. Therefore, let's assume the maximum assigned trunk bandwidth is 64 Kbps, a factor 0.6 may be applied to take into consideration the silence removal effect. Then when the system operates with a compression rate of 5, the transmission bandwidth effectively required is (64× 0.6)/5=7 Kbps. Otherwise, should the channel operate on data issuing from a modem, i.e. not deriving from voice, the required bandwidth is 64/5=13 Kbps. Accordingly:

$$C_{eq}=\{0;7\text{ Kbps}; 13\text{ Kbps}\}$$

But assuming, the considered voice channel is not provided with compression, then the equivalent capacities of the connection should be:

$$C_{eq}=\{0; 40\text{ Kbps}\}$$

Also, and in all instances, should a signal issuing from a modem be detected, the system bandwidth reservation should switch to a bandwidth of 64 Kbps.

Figure 4:
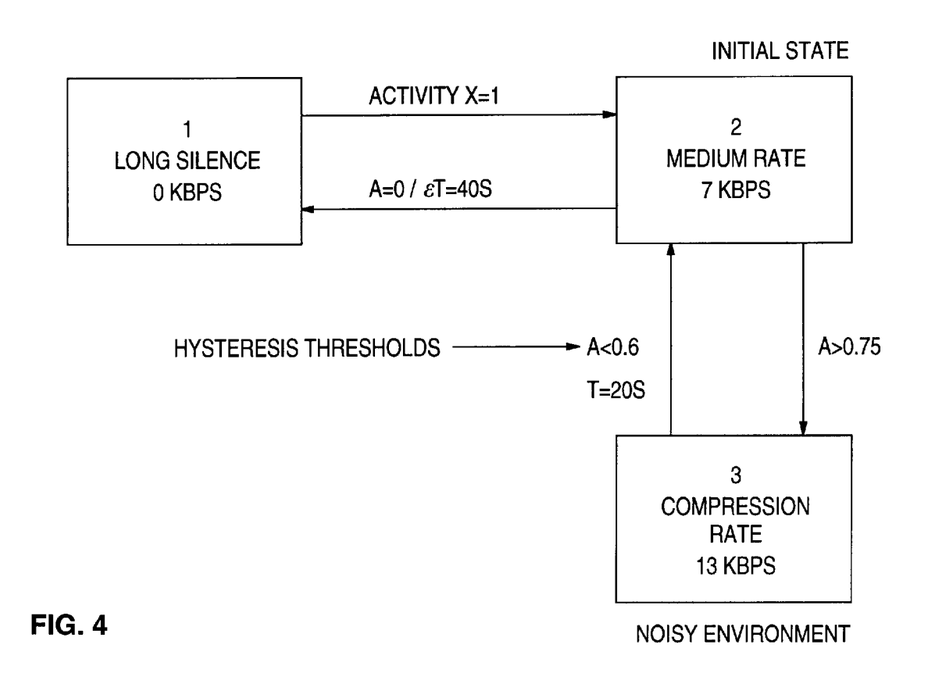
FIG. 4 is an example of state machine of the system operating according to the invention.

Represented in FIG. 4 is an example of the state machine operating according to the above mentioned hysteresis cycle as disclosed with reference to FIG. 3.

As mentioned, the initial (starting) state is performed by assigning a medium rate of 7 Kbps (state 2). The system keeps monitoring the integration function (A) with a period of T=20 s.

Should A reach the 0.75 threshold, denoting a noisy environment including music, the bandwidth reservation is switched to 13 Kbps (state 3). From this state, the system may go back to state 2 if A goes below 0.6. Now, should A switch to zero during two consecutive integration periods (i.e. TAE=2T=40s) while the system is operating at 7 Kbps, which denotes a long silence, the assigned bandwidth is fixed to 0 Kbps (43). But as soon as X=1, denoting again an active audio channel, the 7 Kbps is reassigned while the corresponding block is flagged as special block (so called red flagged blocks). Thus no data is lost. But such flagging helps in, possibly later on, locating any discardable block within the network in case network congestion occurs.

Figure 5:
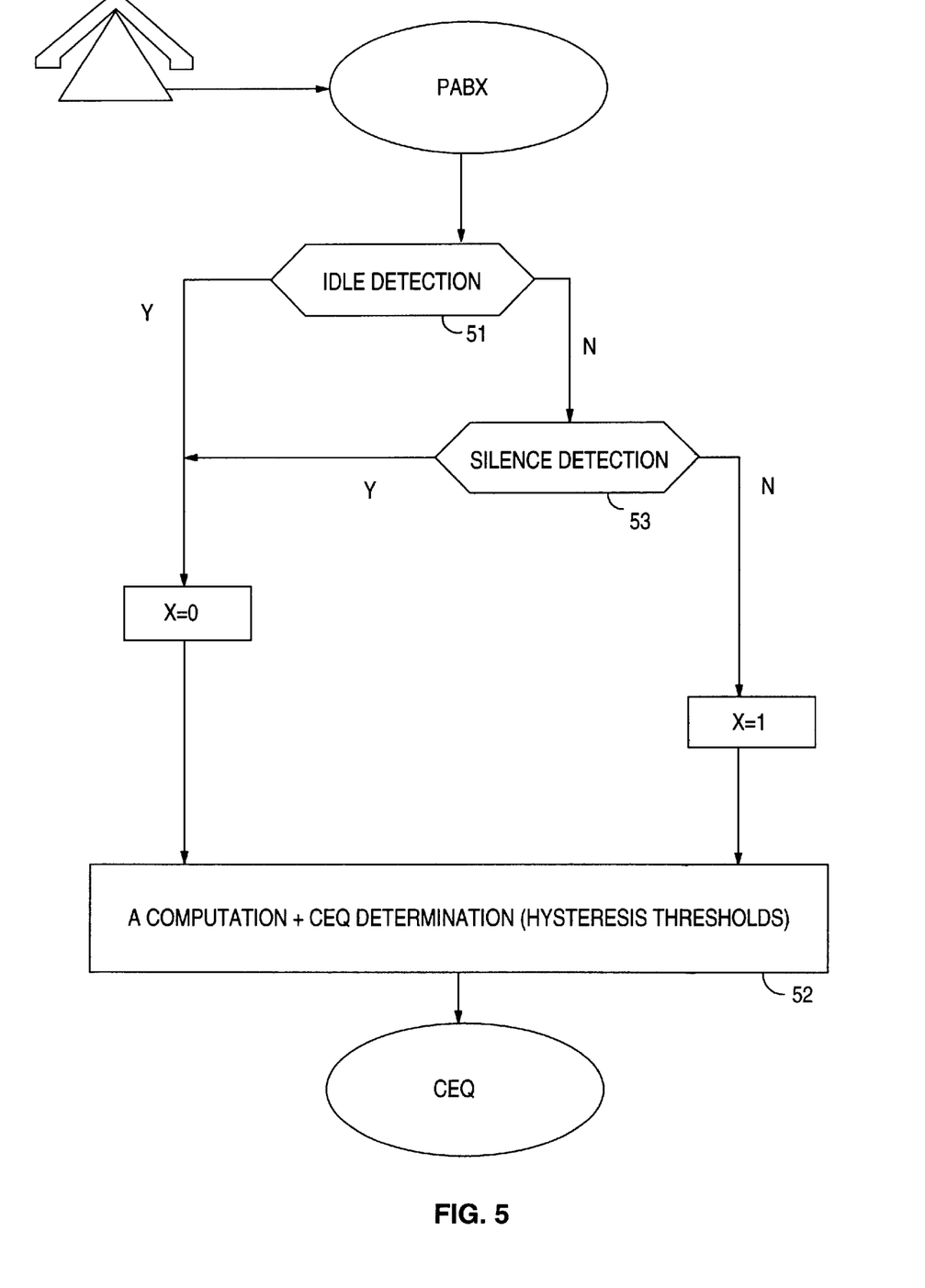
FIGS. 5 and 6 are flow-charts summarizing operations performed according to the invention.

The flowchart of FIG. 5 summarizes the operations performed in the network entry port to which an audio type device (e.g. a PABX) is attached. The process checks whether the audio type channel is simply idle (51), in which case X=0 is fed into the system performing the operations (see 52), for computation of the A(n) function and determine $C_{eq}$ to be assigned. But if the system is not idle, the process checks whether the received data indicate a silence block (53). If yes, then X=0 and, again, the process goes to operations (52). Otherwise, should the processed data block be provided by an active block from an audio channel then X=1 is fed into the system performing the operations (52).

The idle detection means recognizes a fixed pattern. Silence detection requires more elaborate operations since the channel might be noisy and therefore silence detection cannot be performed on a level basis. Means for performing silence detection shall be described later on as performing the so-called VAD, or more generally speaking the audio channel activity, determinations.

Figure 6:
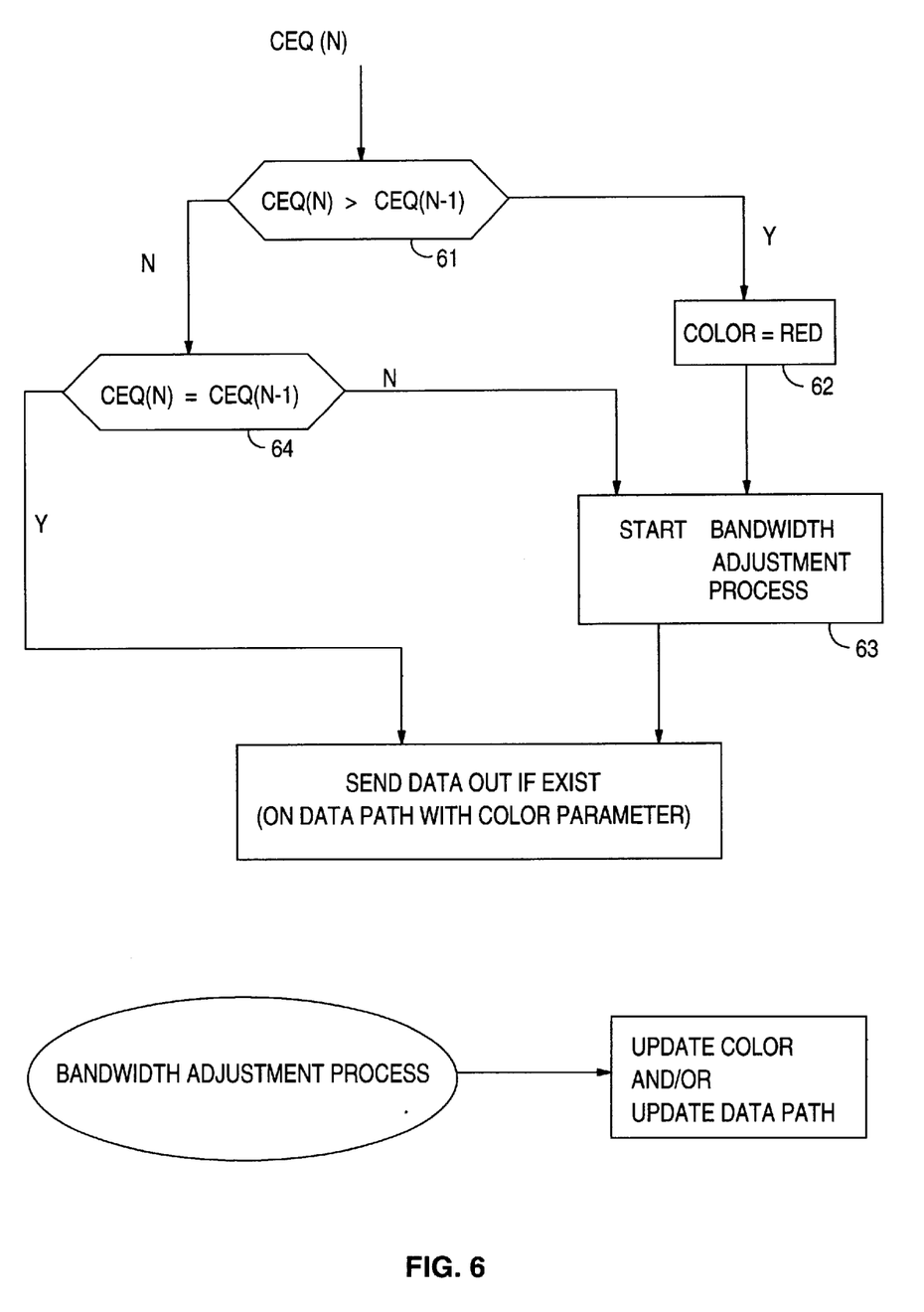

As already mentioned, the loss of any data block is minimized whenever a bandwidth increase is required, by flagging in the meantime the processed data blocks. In case of network congestion, said flagged data packets are discardable This is illustrated in FIG. 6 with the so called red flag (62). To that end, the bandwidth, i.e. equivalent capacity of the connection $C_{eq(n)}$ just assigned (see FIG. 5) is first checked (see 61) versus the previous value $C_{eq(n-1)}$. If $C_{eq(n)} > C_{eq(n-1)}$ then the corresponding block of signal is flagged and the bandwidth adjustment process is started (63). But if the test (61) is negative, then a second test (64) is performed to determine whether $C_{eq(n)} = C_{eq(n-1)}$ or not. If yes, then no further bandwidth adjustment is required. If not, the process proceeds with operations (63) for bandwidth adjustment. Whenever bandwidth process is performed, the so called color flagging should be updated and/or the data path assigned to the audio channel data through the high speed digital network should be updated. This is performed conventionally using a path selection process, scanning all possible network links down to the destination port and implying the use of a conventional selection method e.g. the method based on the so called Bellman-Ford Algorithm.

Figure 7:
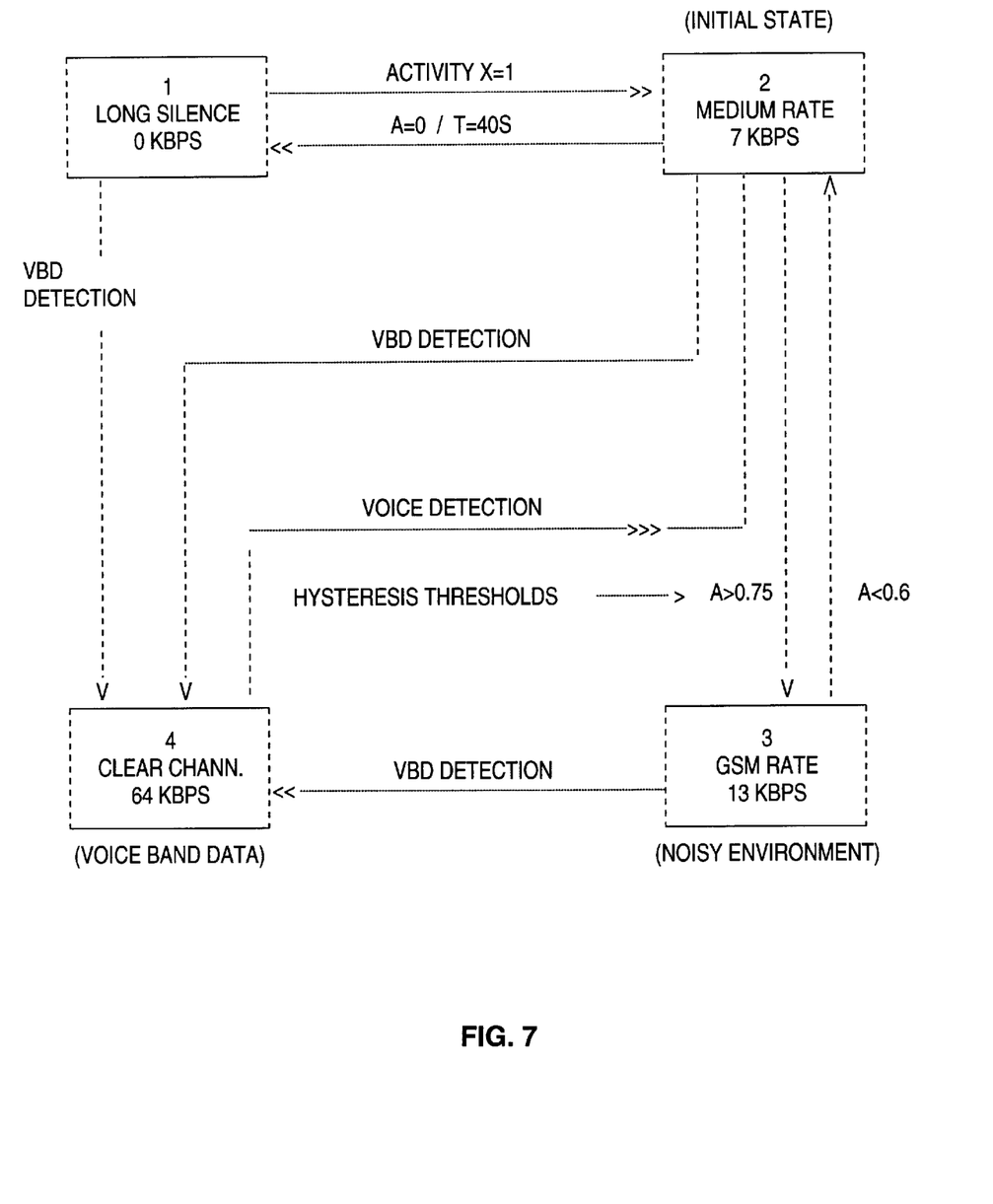
FIG. 7 is another state machine of the system operating according to the invention.

Also as already mentioned, the audio channel might be connected to the network port through a modem operating for instance at 64 Kbps for FAX. In that case, the system should be able to switch to a convenient reserved bandwidth (e.g. 64 Kbps) from any of the three states like {zero; 7 Kbps; 13 Kbps} for instance as disclosed with reference to FIG. 4. The corresponding complete state machine is illustrated in FIG. 7 showing a fourth state at 64 Kbps. As indicated therein switching to said fourth state requires performing a so called Voice Band Detection (VBD) to detect the presence of a pure sine-wave tone on the channel. Said tone might conventionally be either at 2100 Hz or at 1100 Hz. The circuit required is then rather simple. For instance, the audio channel data is fed in parallel through two band-pass filters, one tuned on 2100 Hz and the second tuned on 1100 Hz. The energy on each filter output is then computed, together with the energy measured with no filtering of the audio channel (i.e. energy on the 2100 and 1100 Hz tuned filters inputs) Then very simple logic is used to detect whether the input energy was or was not concentrated on 2100 Hz or 1100 Hz. In case of concentration about these frequencies, the audio channel is operated on a modem (VBD is detected). Then the reserved bandwidth request is set to 64 Kbps (see 4). As shown in FIG. 7, this is made possible from any of the three original states (see states 1, 2 and 3). Now, while being in state 4, the system can switch back to the original starting state, i.e. state 2 (with $C_{eq}$=7 Kbps) This is achieved through a so called voice detection logic checking whether the energy is distributed randomly about 1800 Hz or not.

Now, as far as the so-called VAD or audio activity channel measurement is concerned, several methods might be used. For instance, refer to the flow chart in FIG. 8 which might apply to a network wherein the audio channel coding is performed according to the coder described in the above mentioned Galand et al. Article of 1988. Such a coder delivers, for each block of samples of a 20 ms long segment of signal, a set of so-called auto-correlation coefficients R(i), with i=1, 2, . . . . , 8, as well as an audio channel energy indication. In the present invention said block energy shall be considered as represented by XMAX, i.e. the largest signal sample within the considered 20 ms long block of samples. But should the coder involved in the considered audio channel not provide said auto-correlation coefficients, then the system of this invention performs the operations on the audio signal samples as indicated in the above mentioned publication.

Also, to help understand the audio flag generation, note that two thresholds, i.e. a.VADTH and b.VADTH, with "a" and "b" being empirically determined coefficients, are defined. VADTH is a threshold value made self-adaptable through the VAD flag determination process as disclosed with reference to FIG. 8. The process starts with clamping the VADTH to predefined maximum and minimum values, i.e. THMAX and THMIN respectively Accordingly, should VADTH be higher than THMAX, then VADTH is clamped to THMAX (see 81). Or should VADTH be smaller than THMIN, then VADTH is clamped to THMIN (see 82). In addition, a pre-assigned time-out (TOUT) is decremented to avoid overflow (see 83).

Figure 8:
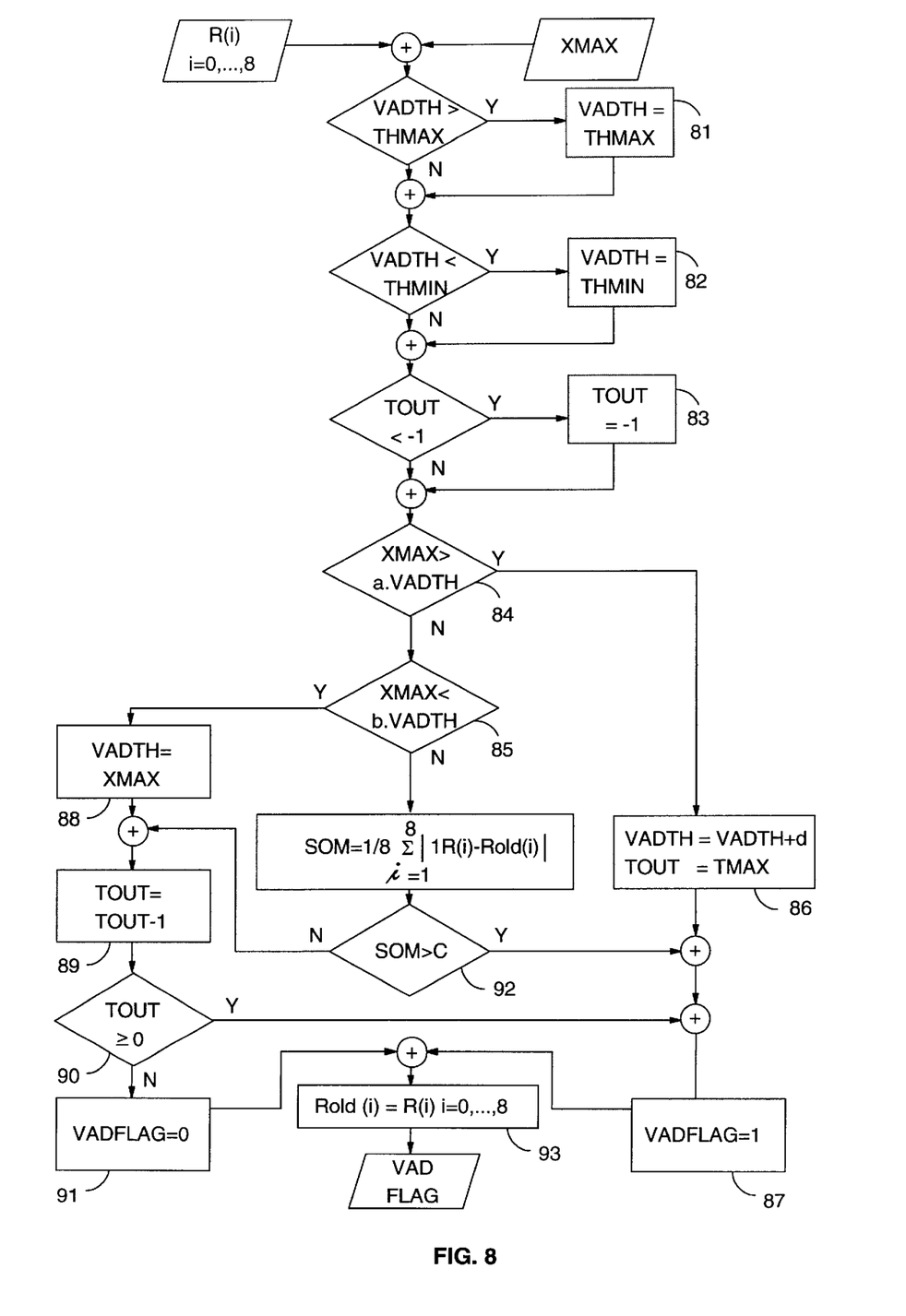
FIG. 8 is a flow-chart for computing one of the parameters required for implementing the invention.

Then, the VAD flag (VADFLAG) determination test proceeds with comparing XMAX to the two above mentioned thresholds (see tests 84 and 85). If XMAX is higher than a.VADTH, the considered block of samples, representing a 20 ms long segment of signal, is considered active and the VAD flag is set to "1" (87), after incrementing the threshold VADTH to VADTH+d (d being a predefined increment) and setting the time-out to a predefined value TMAX (see 86).

On the contrary, should XMAX be lower than b.VADTH (see 85), then the segment is potentially considered as a non-active segment (e.g. silence), but prior to setting the VAD flag to zero, the VADTH is set to the value measured by XMAX (see 88).; the time-out is decremented by one unit (see 89); and finally a hangover test is performed with the time-out (TOUT) being tested versus a negative value (see 90). Otherwise, if TOUT is positive or null, then the VAD flag is set to "one".

Finally if XMAX is in-between the thresholds a.VADTH and b.VADTH, then a spectrum variation (SOM) is computed through:

$$\text{SOM} = 1/8 \sum_{i=1}^{8} |R(i) - R_{old}(i)|$$

wherein:
SUM is a conventional summing operation;
R(i) with i=0, 1 . . . . , 8 is the current set of auto-correlation coefficients;

$R_{old}(i)$ is the set of auto-correlation coefficients associated with the previously processed block of samples.

Then, SOM is compared to an empirically defined value "c" (see 92).

Should SOM be higher than "c", the VAD flag is set to "one", otherwise, the flow-chart branches to (89).

Finally, the $R_{old}(i)$ set of auto-correlation is updated by storing R(i) for next block of samples to be processed (see 93).

We claim:

1. A method for optimizing the reserved transmission bandwidth assigned to an audio channel connection providing data to an entry node in a high speed digital network, said method including:

splitting the audio channel data into fixed length blocks of data;

monitoring the audio channel activity as indicated by the activity variations of said data blocks and deriving therefrom a so-called audio channel activity flag data;

integrating consecutive audio channel activity flag data through a predefined integration function A(n), n being the time reference, operated over said audio channel activity flag data;

monitoring, at a predefined rate, said integrated function A(n) with respect to predefined threshold values; and switching said bandwidth reservation to a transmission bandwidth value selected among a set of predefined transmission bandwidth values when said monitored integrated function A(n) data reaches one of said predefined threshold values.

2. A method for optimizing transmission bandwidth reservation according to claim 1 wherein said transmission bandwidth is initially set to a predefined transmission bandwidth value.

3. A method for optimizing the reserved transmission bandwidth according to claim 2 wherein said integration function A(n) is selected to perform low-pass filtering operations over said audio channel activity flag data, whereby:

$$A(n+1)=(1-\alpha) \times A(n) + \alpha \times X(n)$$

wherein:

n is the time reference value,

X(n) is the audio channel activity flag value at time n,

A(n) is the integration function at time n, and $\alpha$ is an integration constant.

4. A method for optimizing transmission bandwidth reservation according to claim 3 characterized in that said integration constant value $\alpha$ is selected such that only long silences are detected through said integration.

5. A method for optimizing the transmission bandwidth reservation according to claim 4 wherein said integration constant is selected to be $$\alpha = \Delta t / T$$

wherein $\Delta t$ is the time length of said fixed length block of data; and

T is the predefined rate for monitoring said low-pass filtered data A(n).

6. A system for optimizing the transmission bandwidth reserved to an audio channel connection providing data over a port of an entry node in a high speed digital network, said data being provided into fixed length blocks of digitally encoded samples of audio channel data, said system including:

means for measuring audio channel activity and setting an audio channel activity flag data X(n) to differentiate between an audio channel active state and an audio channel non-active state;

low-pass filtering means sensitive to said audio channel activity data for providing low-pass filtered data A(n);

monitoring means for monitoring at a predefined rate said low-pass filtered data A(n) and for detecting whenever said low-pass filtered data crosses any of a set of predefined threshold values; and, transmission bandwidth adjustment means sensitive to said monitoring means, for assigning said reserved transmission bandwidth one of the predefined values.

7. A system as in claim 6, wherein said data is provided to said network through a modem at said port, further comprising:

tone detection means for detecting a predefined frequency sine wave.

8. A system as in claim 7, wherein said tone detection means includes:

band-pass filtering means for filtering said audio channel data;

first energy measuring means connected to said band-pass filtering means for measuring the energy provided by said band-pass filtering means;

second energy measuring means connected to said audio channel for measuring the energy provided over said audio channel; and, logic means connected to said first and second energy, measuring means for determining whether the energy provided over said audio channel is concentrated within the bandwidth of said band-pass filtering means.

9. A system as in claim 8 wherein said means for measuring audio channel activity and setting the audio channel activity flag include:

auto-correlation means for computing a set of auto-correlation coefficients for a block of samples;

energy measuring means for measuring the energy over said audio channel as represented by the largest sample, XMAX, of the block of samples;

comparing means for comparing said XMAX to a predefined high threshold and a predefined low thresholds and, if XMAX is larger than said high threshold, setting the audio channel activity flag to one; if XMAX is smaller than the low threshold, setting the audio channel activity flag to zero;

means for computing spectrum variation through auto-correlation coefficients variation between said block of samples and the preceding block, and, if XMAX is within the predefined high and low thresholds, relying on said spectrum variation to determine whether the audio channel activity flag should be set to "zero" or to "one".

10. A system as in claim 8 further comprising means for switching the reserved bandwidth to the highest preassigned bandwidth if said energy is concentrated within the bandwidth of said band pass filtering means.

* * * * *